United States Patent
Nelson et al.

(10) Patent No.: US 11,971,965 B2
(45) Date of Patent: Apr. 30, 2024

(54) SYSTEM AND METHOD FOR DETERMINING ATTRIBUTION ASSOCIATED WITH LICENSED SOFTWARE CODE

(71) Applicant: Oracle International Corporation, Redwood Shores, CA (US)

(72) Inventors: Mark Nelson, Livingston, NJ (US); Paul Mackin, Manchester, NH (US); Daniel Simone, Newtown, PA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/553,587

(22) Filed: Dec. 16, 2021

(65) Prior Publication Data

US 2023/0195857 A1 Jun. 22, 2023

(51) Int. Cl.
*G06F 21/10* (2013.01)
(52) U.S. Cl.
CPC ................... *G06F 21/105* (2013.01)
(58) Field of Classification Search
CPC .................................................... G06F 21/105
USPC ............................................................ 726/26
See application file for complete search history.

(56) References Cited

U.S. PATENT DOCUMENTS

| | | | | |
|---|---|---|---|---|
| 8,359,655 B1* | 1/2013 | Pham | ....................... | G06F 21/12 |
| | | | | 717/121 |
| 9,471,285 B1* | 10/2016 | Koohgoli | ................ | G06F 8/751 |
| 10,229,251 B1* | 3/2019 | Dalessio | ................... | G06F 8/71 |
| 10,747,852 B1* | 8/2020 | Dalessio | ................ | G06F 21/10 |
| 2010/0241469 A1* | 9/2010 | Weigert | ............. | G06F 11/3604 |
| | | | | 717/124 |
| 2022/0198003 A1* | 6/2022 | Shaver | ....................... | G06F 8/70 |

OTHER PUBLICATIONS

Software Package Data Exchange (SPDX) Workgroup, a Linux Foundation Project, "SPDX License List, Version: 3.15 2021-11-14"; © 2018, 19 pages, retrieved on Nov. 18, 2021 from: <https://spdx.org/licenses/>.

* cited by examiner

*Primary Examiner* — Michael S McNally
(74) *Attorney, Agent, or Firm* — TUCKER ELLIS LLP (57) ABSTRACT

In accordance with an embodiment, described herein is system and method for use with software application development environments, for determining attribution associated with licensed software code. The system can receive as input an indication of a source application codebase for a software application, determine dependencies on third-party modules, libraries, or other software code, and output associated license attributions for that codebase. Optionally, the system can combine and/or de-duplicate multiple sets of attributions associated with a source application codebase, or generate a set of differences between two versions of attributions, to illustrate changes between the versions. In accordance with an embodiment, if the system detects potential licensing issues associated with the use of third-party modules, libraries, or other software code, then an appropriate notification can be generated.

20 Claims, 10 Drawing Sheets

SYSTEM AND METHOD FOR DETERMINING ATTRIBUTION ASSOCIATED WITH LICENSED SOFTWARE CODE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to software development environments, and are particularly directed to a system and method for determining attribution associated with licensed software code in such environments.

BACKGROUND

Software development is a common aspect of many enterprise computing environments. In some instances, a complex software application may include modules, libraries, or other software code provided by third-party entities. Such entities may provide their software code under licenses that restrict certain usage. For example, a particular third-party license may restrict the use of associated software code to testing or non-commercial purposes, absent some further permission or attribution.

As such, when a software developer uses third-party software code, including open-source software code, in their software application, they typically need to review any copyright, patent, or other license terms or conditions, to ensure the development and use of the software application conforms to any obligations under those licenses.

Since a complex software application can include many external dependencies on modules, libraries, and/or other third-party software code, due to the recursive nature of dependencies, the determination or tracking of third-party licensing requirements imposes a significant burden on the developer to manually collect and assess the relevant license information.

SUMMARY

In accordance with an embodiment, described herein is system and method for use with software application development environments, for determining attribution associated with licensed software code. The system can receive as input an indication of a source application codebase for a software application, determine dependencies on third-party modules, libraries, or other software code, and output associated license attributions for that codebase. Optionally, the system can combine and/or de-duplicate multiple sets of attributions associated with a source application codebase, or generate a set of differences between two versions of attributions, to illustrate changes between the versions. In accordance with an embodiment, if the system detects potential licensing issues associated with the use of third-party modules, libraries, or other software code, then an appropriate notification can be generated.

DETAILED DESCRIPTION

Software development is a common aspect of many enterprise computing environments. In some instances, a complex software application may include modules, libraries, or other software code provided by third-party entities. Such entities may provide their software code under licenses that restrict certain usage. For example, a particular third-party license may restrict the use of associated software code to testing or non-commercial purposes, absent some further permission or attribution.

As such, when a software developer uses third-party software code, including open-source software code, in their software application, they typically need to review any copyright, patent, or other license terms or conditions, to ensure the development and use of the software application conforms to any obligations under those licenses.

Since a complex software application can include many external dependencies on modules, libraries, and/or other third-party software code, due to the recursive nature of dependencies, the determination or tracking of third-party licensing requirements imposes a significant burden on the developer to manually collect and assess the relevant license information.

In accordance with an embodiment, described herein is system and method for use with software application development environments, for determining attribution associated with licensed software code. The system can receive as input an indication of a source application codebase for a software application, determine dependencies on third-party modules, libraries, or other software code, and output associated license attributions for that codebase.

Optionally, the system can combine and/or de-duplicate multiple sets of attributions associated with a source application codebase, or generate a set of differences between two versions of attributions, to illustrate changes between the versions.

In accordance with an embodiment, if the system detects potential licensing issues associated with the use of third-party modules, libraries, or other software code, then an appropriate notification can be generated.

In accordance with various embodiments, technical advantages of the described approach include, for example, that the system can automatically determine third-party license attribution, for complex enterprise software applications potentially including many external dependencies on modules, libraries, and/or other third-party software code, at a speed several orders of magnitude faster than a manual process, and with much higher accuracy. Using the described approach, a medium sized project with several hundred dependencies can be assessed within minutes—work that might otherwise take a week to perform manually.

Attribution Helper

Figure 1:
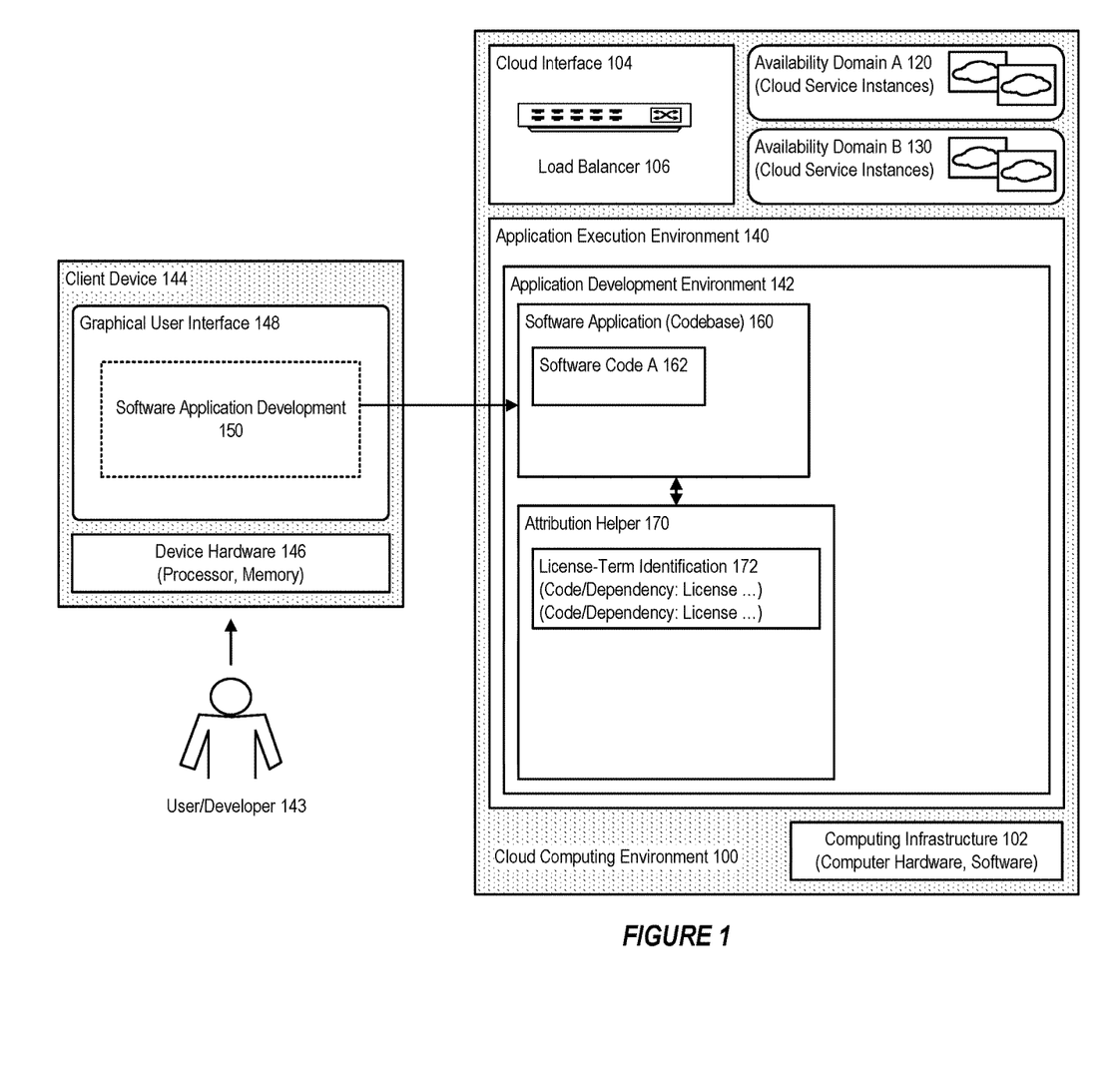
FIG. 1 illustrates a system for determining attribution associated with licensed software code in a software application development environment, in accordance with an embodiment.

FIG. 1 illustrates a system for determining attribution associated with licensed software code in a software application development environment, in accordance with an embodiment.

In accordance with an embodiment, the components and processes illustrated in FIG. 1, and as further described herein with regard to various embodiments, can be provided as software or program code that is executable by a computer system or other type of processing device, for example a cloud computing system.

As illustrated in FIG. 1, in accordance with an embodiment, a computer system can be provided, such as for example a cloud computing environment 100, having a computer infrastructure 102, for example, a combination of computer hardware, e.g., processor, memory, and software, a cloud interface 104, and a load balancer 106, and providing access to one or more cloud service instances at one or more availability domains 120, 130.

The example computer system illustrated in FIG. 1 is provided for purposes of illustrating a computing environment that can utilize attribution associated with licensed software code. In accordance with other embodiments, the various components, processes, and features described herein can be used with other types of computer systems or computing environments, including both cloud-based and non-cloud-based environments, to determine an attribution associated with licensed software code in those systems/environments.

In accordance with an embodiment, the system can include an application execution environment 140 that enables execution of software applications, and a software application development environment 142 that allows a user/developer 143 to develop software applications to run within the system.

For example, in accordance with an embodiment, the user/developer can use a client device 144, such as a computer or mobile device having a device hardware 146, e.g. processor, memory, and graphical user interface 148, to control a software application development process 150, and to develop a source application codebase 160 that includes, for example, a software code A 162 for use with, or as part of the software application.

In accordance with an embodiment, the system can include a software development tool, generally referred to herein as an attribution helper 170, that maintains a license-term identification 172 for a plurality of third-party software code/dependencies known to the system, for use in determining attributions associated with licensed software code.

Figure 2:
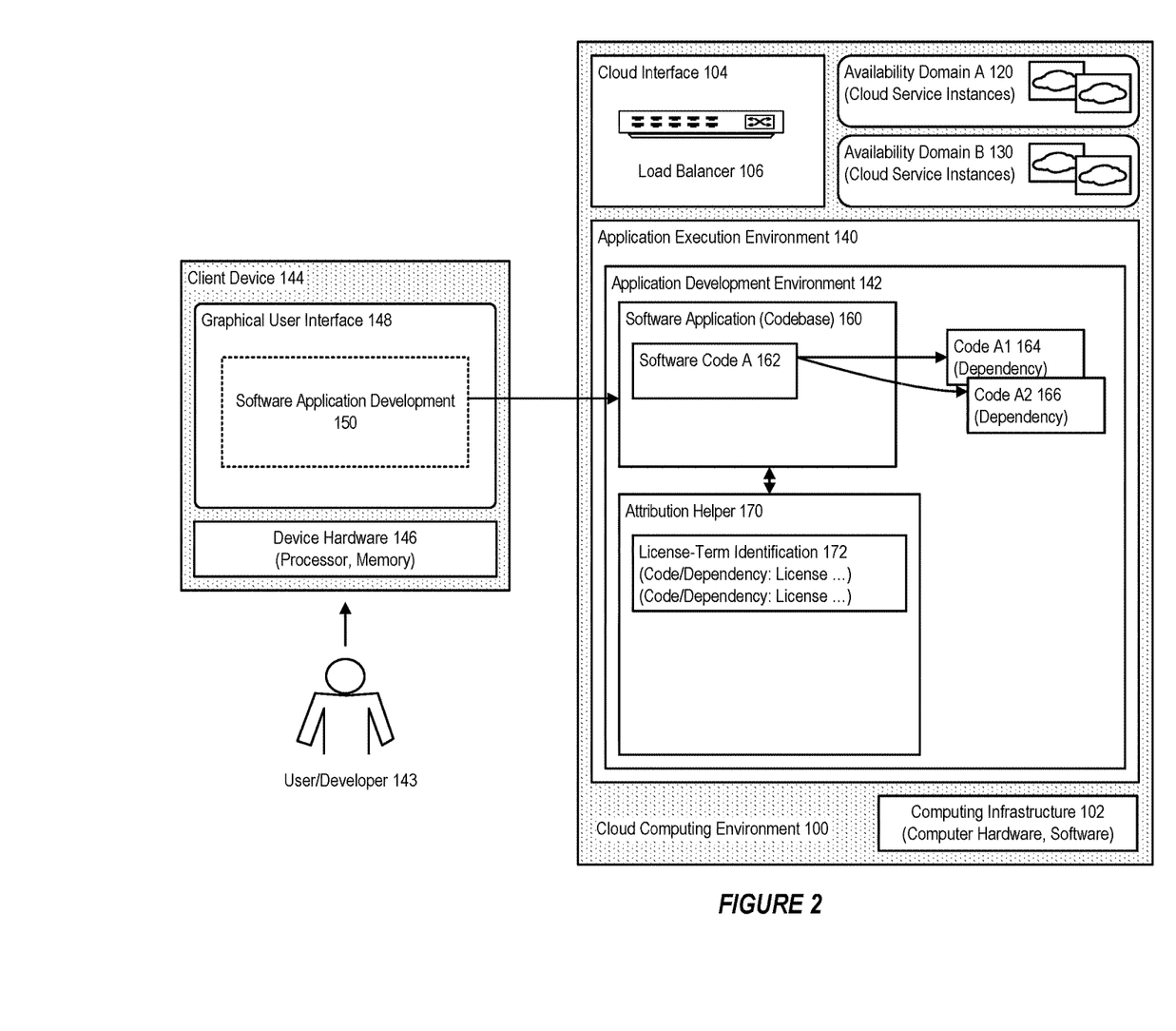
FIG. 2 further illustrates a system for determining attribution associated with licensed software code in a software application development environment, in accordance with an embodiment.

FIG. 2 further illustrates a system for determining attribution associated with licensed software code in a software application development environment, in accordance with an embodiment.

As illustrated in FIG. 2, in accordance with an embodiment, a source application codebase, for example a software code A, can be associated with one more other software code or dependencies A1 164, A2 166.

Figure 3:
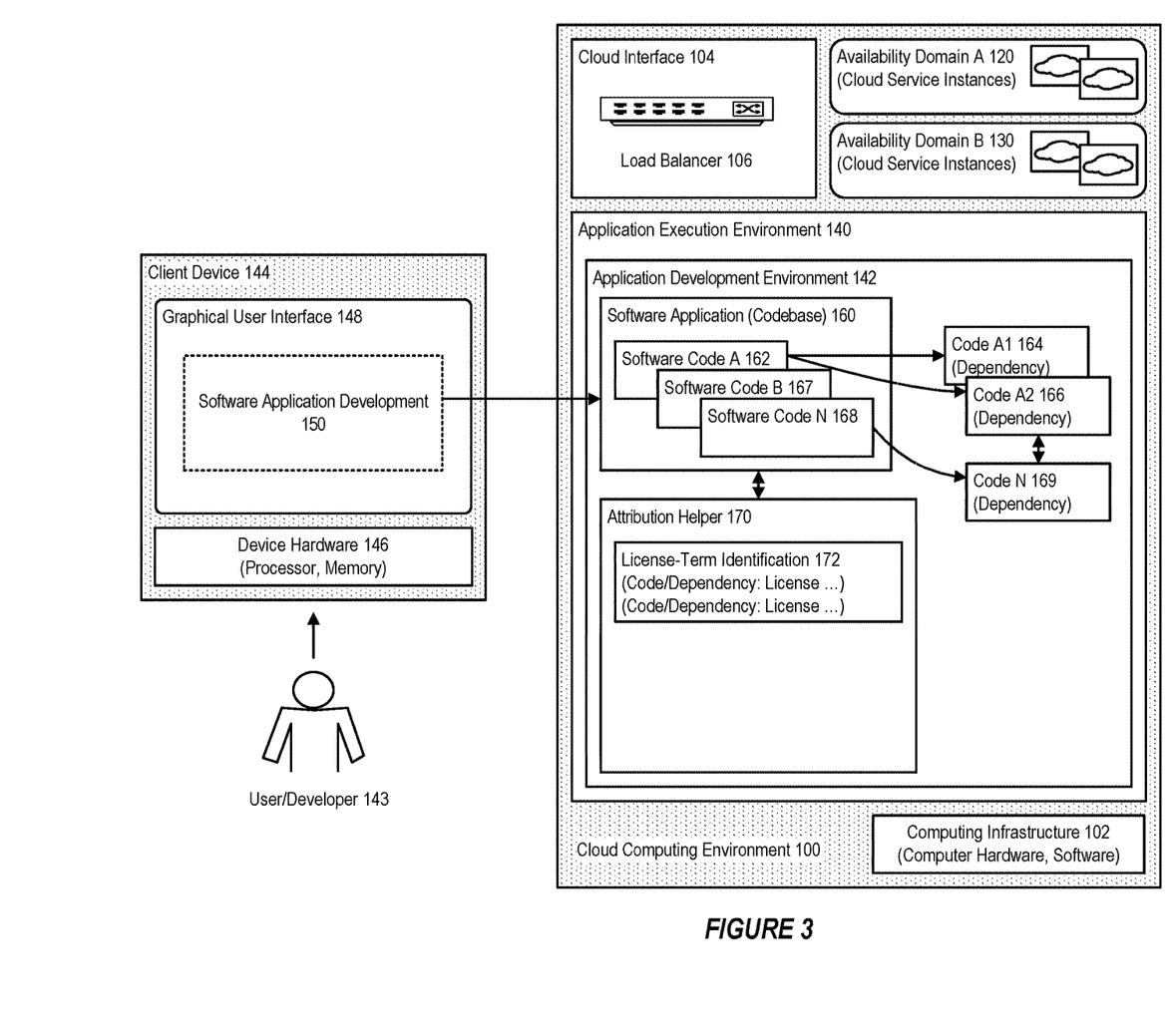
FIG. 3 further illustrates a system for determining attribution associated with licensed software code in a software application development environment, in accordance with an embodiment.

FIG. 3 further illustrates a system for determining attribution associated with licensed software code in a software application development environment, in accordance with an embodiment.

As illustrated in FIG. 3, in accordance with an embodiment, in a similar manner, each of a plurality of other source application codebases, or its associated software code or dependencies, for example software code B 167, N 168, can be associated with a further software code or dependency N 169. Each of the software code or dependencies can recursively depend on various other software code or dependencies.

Figure 4:
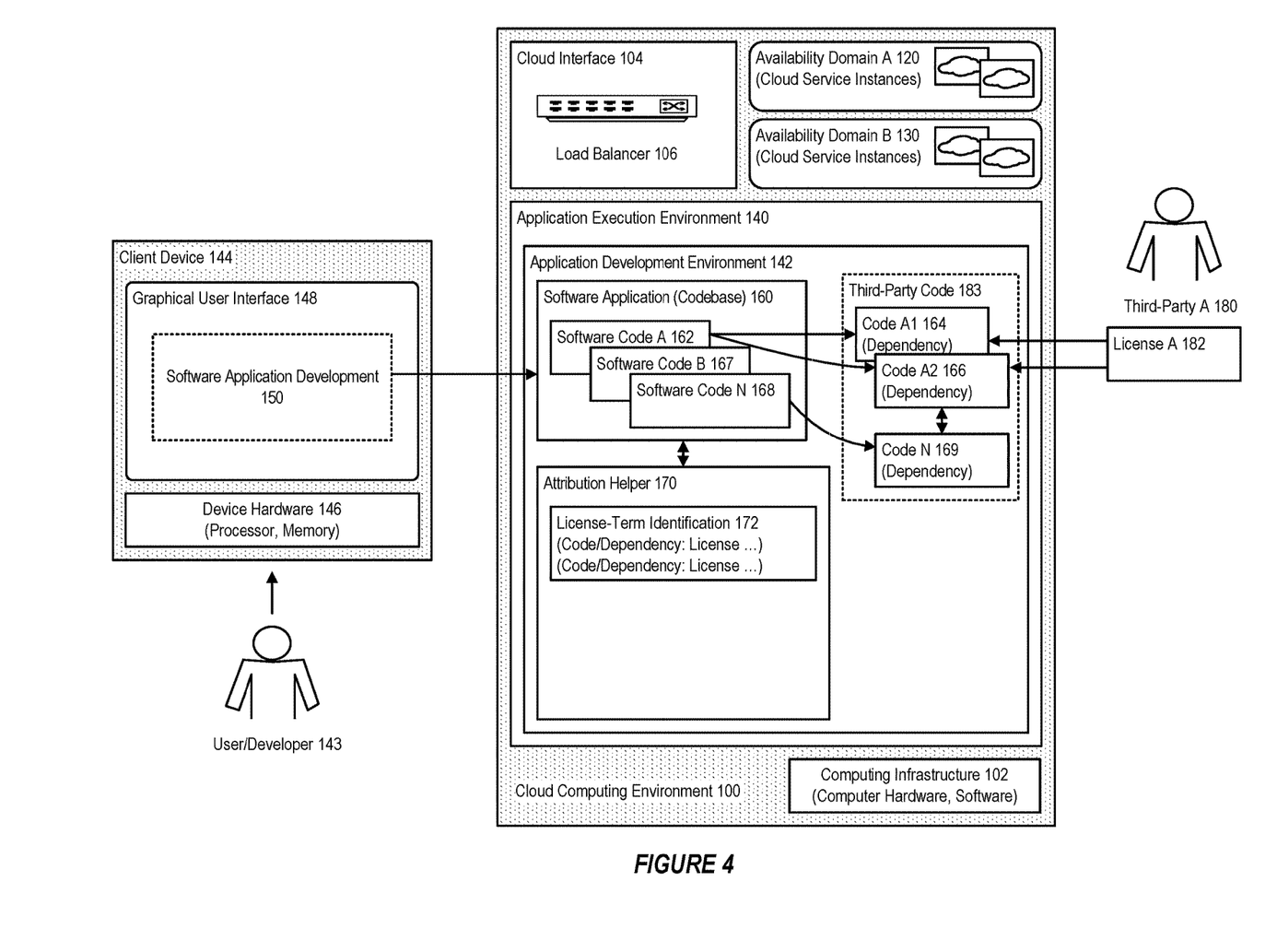
FIG. 4 further illustrates a system for determining attribution associated with licensed software code in a software application development environment, in accordance with an embodiment.

FIG. 4 further illustrates a system for determining attribution associated with licensed software code in a software application development environment, in accordance with an embodiment.

As illustrated in FIG. 4, in accordance with an embodiment, one or more of the software code or dependencies associated with or used by the source application codebase can be provided as third-party code. For example, software code or dependencies A1, A2 can be provided by a third-party A 180, in accordance with a license A 182 and license terms or conditions determined by that particular third-party A.

Figure 5:
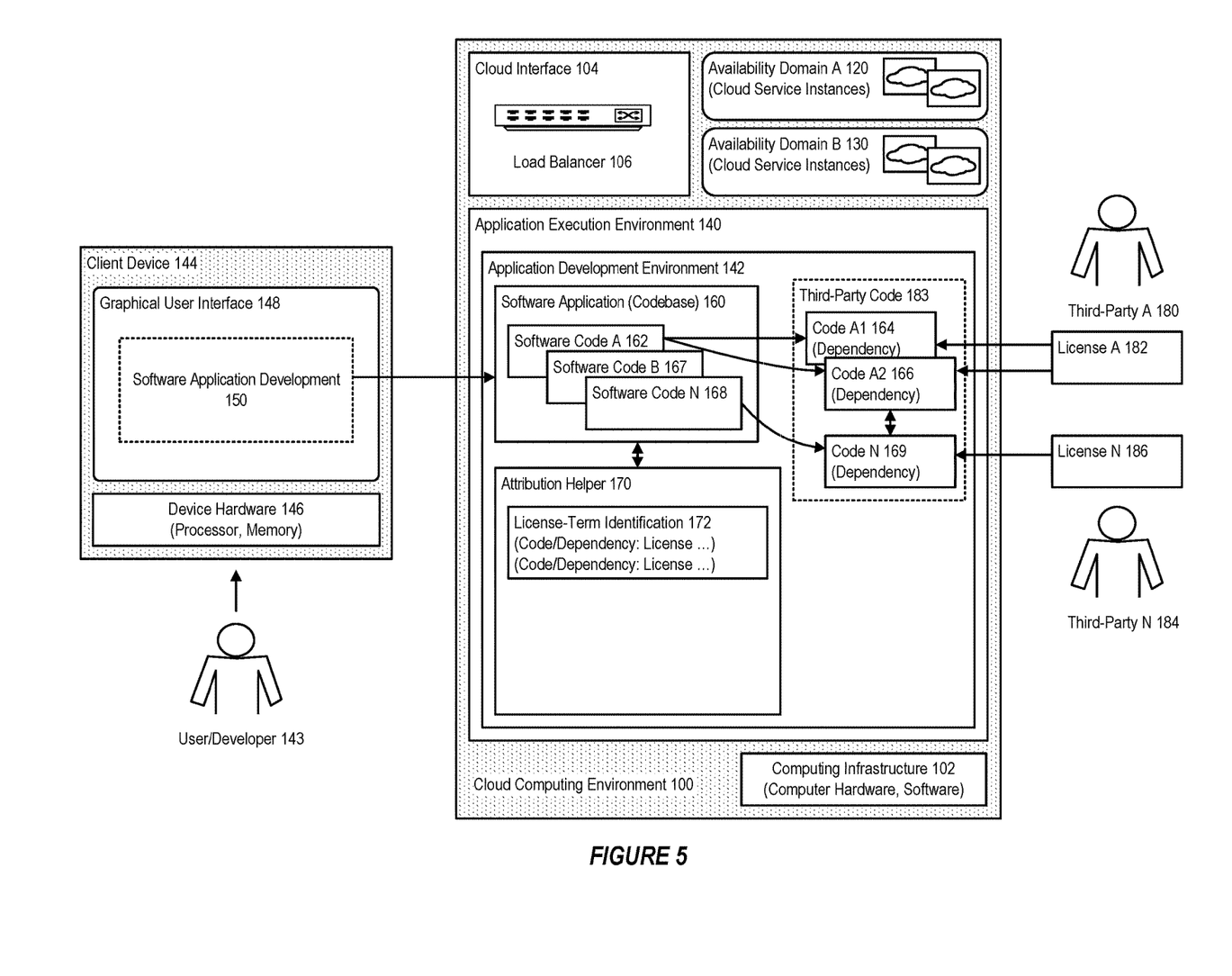
FIG. 5 further illustrates a system for determining attribution associated with licensed software code in a software application development environment, in accordance with an embodiment.

FIG. 5 further illustrates a system for determining attribution associated with licensed software code in a software application development environment, in accordance with an embodiment.

As illustrated in FIG. 5, in accordance with an embodiment, various software code or dependencies can alternatively be provided by other third-parties; for example software code or dependency N can be provided by a third-party N 184, in accordance with a license N 186 and license terms or conditions determined by that particular third-party N.

Figure 6:
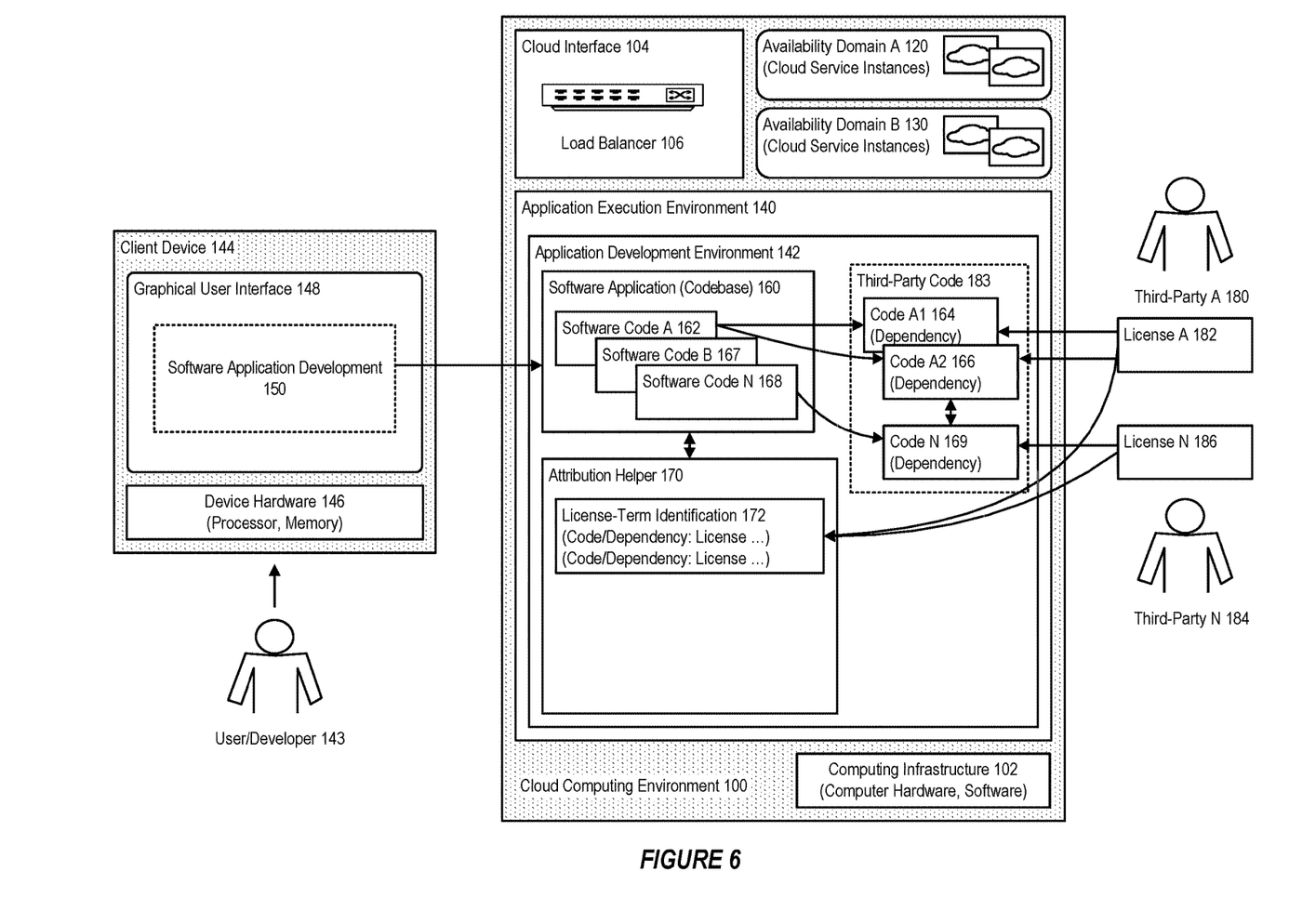
FIG. 6 further illustrates a system for determining attribution associated with licensed software code in a software application development environment, in accordance with an embodiment.

FIG. 6 further illustrates a system for determining attribution associated with licensed software code in a software application development environment, in accordance with an embodiment.

As illustrated in FIG. 6, in accordance with an embodiment, the attribution helper maintains within its license-term identification an indication for each third-party software code or dependencies provided by the various third-parties and known to the system, for use in determining attributions associated with licensed software.

Figure 7:
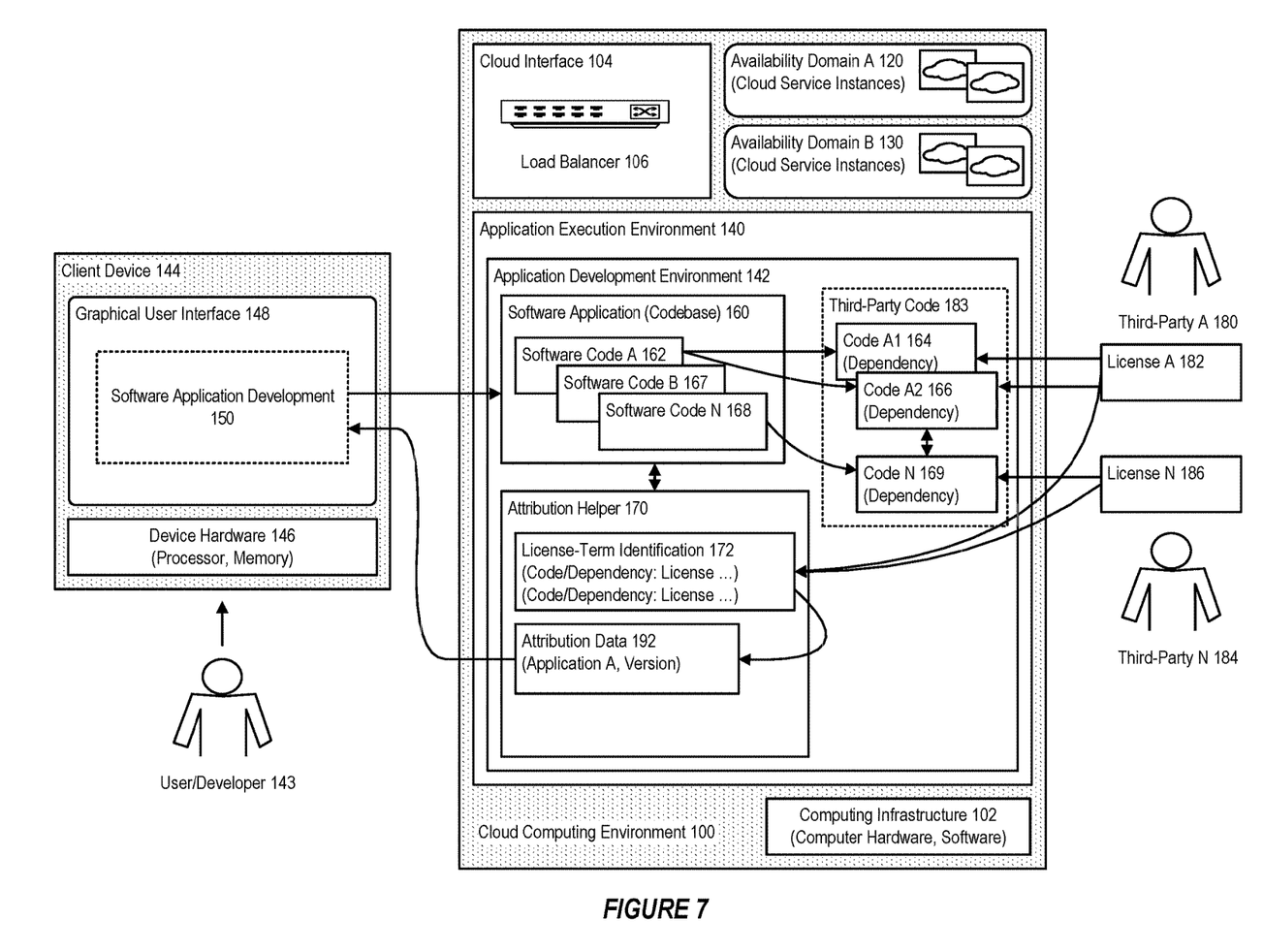
FIG. 7 further illustrates a system for determining attribution associated with licensed software code in a software application development environment, in accordance with an embodiment.

FIG. 7 further illustrates a system for determining attribution associated with licensed software code in a software application development environment, in accordance with an embodiment.

As illustrated in FIG. 7, in accordance with an embodiment, during the development of a source application codebase, the attribution helper determines dependencies on any third-party modules, libraries, or other software code, and outputs the associated license attributions for that codebase, as an attribution data 192, or a notification. The attribute information can be used by the software developer or responsible person within an organization to detect potential licensing issues associated with the presence of third-party modules, libraries, or other software code, and respond accordingly.

For example, in accordance with an embodiment, the system can operate to identify recursive/transitive dependencies of a source application codebase written in, for example, Go®, Java®, or JavaScript®, or a combination of these or other software programming languages, access the source code for those dependencies, optionally determine which dependencies are only used for testing purposes, and collect each of the license terms, e.g., copyright, patent, or other notices or conditions, that are associated with those dependencies.

In accordance with an embodiment, the system can identify, within the license terms associated with the recursive/transitive dependencies, canonical license text or variations, and produce a list of dependencies sorted/grouped by license and in a format useable by, for example, an organization's legal department or other entity overseeing third-party license compliance. License terms that may not be not consistent with the organization's stance as to the use of third-party software code can be identified, and an appropriate user alerted.

In accordance with an embodiment, the system can identify licenses or license terms by comparing them to known canonical forms (e.g., word-by-word). The system can recognize and allow for non-material differences, for example the use of an asterisk in place of a hyphen as a list delimiter; optional preamble or postscript text; or cases where multiple licenses are included in the same text, for example in the case where a dependency is offered with a choice of license. It can also recognize instances where, for example, a Creative Commons license type is used, and instruct the user to follow additional manual steps in that specific case.

In accordance with an embodiment, the system recursively scans dependencies and their dependencies to identify the full set of transitive dependencies; and obtains the source code for all dependencies and scans the source code looking for notices. Notices are sometimes included in source code, for example in a comment, instead of, or in addition to notices in separate text files in the source code repository.

Figure 8:
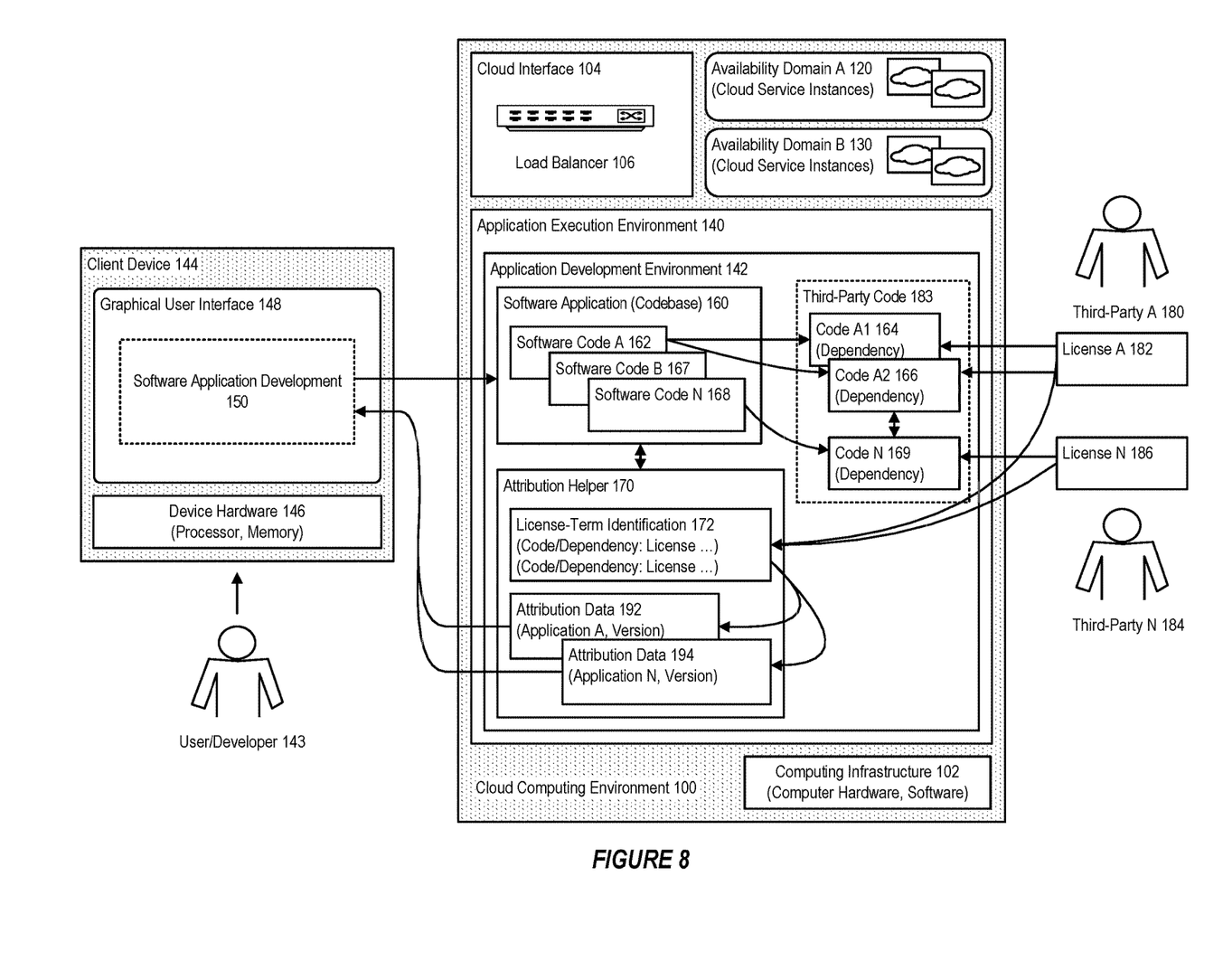
FIG. 8 further illustrates a system for determining attribution associated with licensed software code in a software application development environment, in accordance with an embodiment.

FIG. 8 further illustrates a system for determining attribution associated with licensed software code in a software application development environment, in accordance with an embodiment.

As illustrated in FIG. 8, in accordance with an embodiment, similarly during the update of a source application codebase, or the development of another application that uses other third-party modules, libraries, or other software code, the attribution helper determines updated dependencies on any third-party modules, libraries, or other software code, and outputs the associated license attributions for that codebase as an attribution data 194.

In accordance with an embodiment, the system is able to identify and exclude dependencies which are only used in test code. For Java programs which use Maven this is fairly straightforward, since Maven includes metadata that identifies test-only dependencies. However, for Go programs, there is no such metadata, in which case the system can use additional utilities to determine which code is not actually used or compiled into an executable built from the codebase. Detecting which code is actually used reduces the amount of data that needs to be processed, since generally attributions need only be provided for code that is actually used.

In some cases, a third-party library may have a very large set of its own dependencies that are used to test that code in many different environments. In accordance with an embodiment, the system operates to de-duplicate collected data. For example, once copyright notices are collected, the system can remove those that are the same except for language-specific comment delimiters. De-duplication is also used to ensure that a license text is not repeated multiple times in the attributions that are produced.

In accordance with an embodiment, the system can maintain a list of well-known dependencies, and the location and type of license they use in a particular version/commit hash in a central location. This allows users to share a common library of knowledge.

Optionally, in accordance with an embodiment, the system can combine attribution data from multiple different third-party dependencies and combine these into a single attribution file, performing sorting, grouping and de-duplication in the process. This is useful when a program has different modules with their own sets of dependencies, but attribution needs to be done at the top level of the program, not the lower levels. This scenario can occur commonly in a multi-module Java Maven project, for example.

Optionally, in accordance with an embodiment, the system can calculate the difference between two attribution files, for example from two different versions of the code, and produce a "redline diff" format output which shows what was added and removed/changed. This particular format is useful in determining if any material changes were made to licenses or notices. The system can combine attributions for dependencies written in different languages into a single sorted, grouped and de-duped attribution file.

Attribution Helper—Example Implementation and Usage

The following section illustrates an example of how the systems and methods described herein can be used to provide a development tool (attribution helper), for use with a software application development environment to determine attribution associated with licensed software code.

In accordance with various embodiments, the attribution helper can be used by a software developer or other professional involved in determining software license compliance to, for example: create third-party license attributions; create a content for a "Technology Usage Notes" field; create a "redline diff" for when they need to update that field; de-duplicating third-party license attributions from multiple (sub) projects into one file; or other purposes.

Generally described, in accordance with an embodiment, the attribution helper inspects a local repository, crawls its dependencies and their licenses, collects license-related documents (copyright notices, patent notices, and/or other license-related terms), and creates a file with this information, for subsequent review by, for example, an organization's legal department or other entity overseeing third-party license compliance.

In accordance with an embodiment, the attribution helper tool can be implemented using a programming language such as Go. The prerequisites for using the tool depend on the source language(s) of the source application codebase for which a license attribution is requested.

For example, in accordance with an embodiment for Go projects, just Go is needed. In accordance with an embodiment for Java projects, a Java JDK is required. Additionally, the user/developer must ensure that their Maven (mvn) dependency:list and dependency:sources commands work in the target repository. For JavaScript projects, the user/developer must ensure that a node_modules directory exists or that the npm install command works in the target repository. If a repository is managed by, e.g., Yarn, then the developer may need to install Yarn to initialize the repository.

In accordance with an embodiment, the attribution helper tool can be installed by a developer/user:

go install ./ . . .

The developer/user should ensure Go modules are enabled:

export GO111MODULE=on

By default, the repository directory is the current directory and the output file is ./THIRD_PARTY_LICENSES in the current directory; for example:

attribution-helper gen

The developer/user can specify a local 'go' repository they wish to inspect, along with an different output file:

```
attribution-helper gen --repoDir <local_repo_dir_to_inspect>
    --outputFile <output_file>
```

For example:

```
attribution-helper gen --repoDir ./test-data
    --outputFile /tmp/license.txt
```

Attribution Determination (Go)

In accordance with an embodiment, starting in the repository directory (repoDir), the attribution helper looks for a go.mod indicating that this is a Go project using modules. If the project does not use modules, then a go.mod can be generated from other popular dependency managers using the command:

go mod init

In accordance with an embodiment, the attribution helper collects a list of all of the dependencies recursively for the project:

go list -m all

Next, the attribution helper works through the list of dependencies, and for each one finds all "copyright notices" in the "source code" and "license files". For example, in accordance with an embodiment, the system can operate wherein:

"Source code" means any file with the extension .go.

"Copyright notice" means any line of text with the word "Copyright" ignoring the case, and including somewhere later in that line, a year between 1900 and 2999.

"License files" means any file with the name LICENSE, NOTICE, PATENT, or COPYING, whether spelled in American or British English, and whether singular or plural, and ignoring any extra text (like a file extension) in the name.

"Canonical license text" means the literal, unchanged text of a well-known open source license, as specified or documented for example by Software Package Data Exchange (SPDX).

Next, in accordance with an embodiment, the attribution helper goes through each dependency's license file contents and attempts to identify what license it is, using the following rules:

The system ignore whitespace, e.g. empty lines, or extra whitespace at the beginning or end of a line, If the license contains either of the strings http://www.apache.org/licenses/ or https://www.apache.org/licenses/ (which both appear in versions of Apache License 2.0), then these two strings are considered the same for purposes of comparing the content with the "canonical license text".

If the license contains words that are enclosed in quotation marks, then single and double quotation marks are considered the same for purposes of comparing the content with the canonical license text. For example "AS IS" would be considered the same as 'AS IS'.

If the license contains a bullet or numbered paragraph identifier, meaning any of the following, it is ignored for the purposes of comparing the content with the canonical license text: an asterisk (e.g., *); a number followed by a period, whether enclosed in parentheses or not (e.g., 3.); a number written with lower case i characters followed by a period, whether enclosed in parentheses or not (e.g., iii.); the complete absence of a bullet/number in a place where one exists in the canonical license text.

If the license has lines prepended with > or //, these prepended markers are ignored for the purposes of comparing the content with the canonical license text.

In accordance with an embodiment, the attribution helper looks for the following licenses: Apache License 2.0 BSD 2-clause; BSD 3-clause CDDL 1.0; GPL 2.0; GPL 3.0 ISC; MIT MPL 2.0; BSD 3-clause with well-known modifications. When the license can be identified, the system will group together all of the dependencies that use the same license. The system will also check the license files for copyright notices, as mentioned above.

In accordance with an embodiment, the list of copyright notices found for each dependency are de-duplicated. For example, if each source file had the notice Copyright (c) 2019 Bob, then the system will only report that once. Every unique copyright notice that is found is reported, even if the differences are only in whitespaces or "comment" characters like //.

Finally, in accordance with an embodiment, the data is written to an output file in an appropriate or required format, for example:

```
top-level module name
-------- Copyrights
all copyrights for the top-level module
-------- Notices
all notices for the top-level module
-------- Patents
all patents for the top-level module
======== Lcense full license text
...
======== Dependencies Grouped by License ========
-------- Dependency
a module dependency using this license
-------- Copyrights
all copyrights for this module
-------- Notices
all notices for this module
-------- Patents
all patents for this module
...
-------- Dependency
(repeat 'Dependency' section for each module using this license)
...
======== Dependencies Summary
summary of all modules using the same license
======== License used by Dependencies
full license text
======== Dependencies Grouped by License ========
(repeat for each unique license)
```

In accordance with an embodiment, the attribution helper will produce its output in this format, with the dependencies grouped by license as shown in the specification above.

Go Language—Excluding Test Files

By default, in accordance with an embodiment, the modules that are only used by " . . . test.go" files are excluded. The developer/user can include those modules with the following option, though this is not recommended:
attribution-helper gen --excludeTestModules=false In accordance with an embodiment, the repository in question must be a valid, Go mod-enabled, repository (containing a go.mod file). If there is no go.mod file, then run 'go mod init' in the module root directory.

Java Language—Passing Additional Arguments

In accordance with an embodiment, if the developer/user needs to pass additional arguments to Maven to use specific profiles and restrict the Maven modules for which the tool needs to run for the gen command, they can pass the same with the following option:
attribution-helper gen --buildExtraArgs
For example, for Keycloak builds:

```
attribution-helper gen --mvn ExtraArgs
"-Pdistribution,-pl,distribution/server-dist,-am,-DskipTests"
```

Each Maven argument should be comma separated as shown in the example above. The following Maven command gets executed to get the dependencies for the above example:

```
mvn dependency:list -Pdistribution -Pl distribution/server-dist
  -am -DskipTests
```

JavaScript Language—Excluding Supported Language Types

In accordance with an embodiment, some code repositories have Javascript included statically, with no package.json. In such instances, although we still need to include those dependencies in the attribution file, the tool can't gather the info without a package.json to guide it. In this case the developer/user can use the --skipLanguages option to skip processing of a language that is detected in the repository but can't be processed.

To skip a language, the developer can use --skipLanguages (or -k) followed by a supported language type: Java, Go or JavaScript. If they want to skip more than one language a comma separated list can be provided; and a warning message will be displayed for the language being skipped. The use can then manually gather the dependency info for those files and include it in the attribution file.

Handling Unresolvable Third-Party Licenses

In accordance with an embodiment, a successful run of attribution helper requires that the licenses for all dependencies have been accounted for. The attribution helper will usually be able to resolve dependencies" licenses automatically. However, there will be cases where a dependency puts its license in a non-standard location, and cases where a dependency actually provides no license. In such situations, it may be necessary for a human operator to intervene and explicitly tell attribution helper what to do.

For example, if the attribution helper is unable to resolve a dependency's license, it'll output something like this:

```
Partial success - failed to resolve the following modules:
github.com/kr/logfmt@v0.0.0-20140226030751-b84e30acd515
No license file found.
```

```
Please manually resolve the above module licenses, as described in
https://gitlab-odx.oracledx.com/verrazzano/att
```

Case 1—License File Exists, but Attribution Helper Can't Find it

If the dependency in question does provide a license (but somewhere that the attribution helper can't find), the user/developer will need to add the module name and its license location to a file. This file can be created as $HOME/.attribution-helper/known_licenses.txt, ./known_licenses.txt, or ./thirdparty_licenses/known_licenses.txt (one module per line). In the above example, the license file for the module in question is actually in the file Readme. This can be confirmed by looking under $GOPATH/pkg/mod/github-.com/kr/logfmt\@v0.0.0-20140226030751-b84e30acd515. In this case, the known_licenses.txt file can be updated with the following line:
github.com/kr/logfmt@v0.0.0-20140226030751-b84e30acd515 Readme Case 2—License File Doesn't Exist, but SPDX License Type Known If the dependency in question doesn't provide a license, but there is a readme or some other file that indicates the license type used, then the user/developer can add the SPDXCode for the module name to the same known_licenses files: $HOME/.attribution-helper/known_licenses.txt, ./known_licenses.txt, or ./thirdparty_licenses/known_licenses.txt (one module per line). For example, if the readme only has a line related to licensing with the phrase "MIT License", then the user/developer can update the known_licenses.txt file with the following line:
github.com/kr/logfmt@v0.0.0-20140226030751-b84e30acd515 MIT As another example, if several APACHE-2 licenses are seen that do not use canonical text, the user/developer can put those modules in the known_licenses file with the SPDXCode. This will help reduce the size of the generated THIRD_PARTY_LICENSES.txt file. For example, the following module has a non-canonical Apache-2 license, so this can be added to the known_license.txt file:
github.com/pkg/xyz@v0.8.1 Apache-2.0

Case 3—No License Exists

If the dependency in question in fact has no license, then the user/developer will need to add the module name to a file. This file can be created as $HOME/.attribution-helper/no_licenses.txt, ./no_licenses.txt, or ./thirdparty_licenses/no_licenses.txt (one module name per line). In the above example, no_licenses.txt would read:
github.com/kr/logfmt@v0.0.0-20140226030751-b84e30acd515

Master License List

In accordance with an embodiment, the system can maintain a master list of license records, for example as a master known_licenses.txt file:

```
github.com/aliyun/aliyun-oss-go-sdk@v2.0.4+incompatible Apache-2.0
github.com/garyburd/redigo@v0.0.0-20150301180006-535138d7bcd7
Apache-2.0
github.com/lightstep/lightstep-tracer-common/golang/gogo@v0.0.0-
20190605223551-bc2310a04743 MIT
```

In accordance with an embodiment, the system can similarly maintain a master list of no license records, for example as a master no_licenses.txt file:

github.com/operator-framework/api@v0.3.7-
0.20200602203552-431198de9fc2
github.com/munnerz/goautoneg@v0.0.0-20120707110453-
a547fc61f48d
Fourth-Party Dependency List In accordance with an embodiment, the summary of all the fourth party dependencies are placed into a form; and this list is output by the tool under the Module Dependencies: section. For example:

```
github.com/
go-openapi/spec v0.17.2
go-openapi/strfmt v0.17.0
go-openapi/swag v0.17.2
go-openapi/validate v0.18.0
gogo/protobuf v0.0.0-20171007142547-342cbe0a0415
golang/glog v0.0.0-20160126235308-23def4e6c14b
golang.org/
x/image v0.0.0-20190227222117-0694c2d4d067
x/mobile v0.0.0-20190312151609-d3739f865fa6
...
```

Canonical License Warning

In accordance with an embodiment, a warning can be issued when non-canonical licenses are found:
WARNING: Canonical Licenses not found for the following modules:

This is just a warning, since the text from those licenses are included in the output THIRD_PARTY_LICENSES file.
Example Use with Containerized Environments FIG. 9 illustrates an example use of the system for providing a software application within a containerized environment, in accordance with an embodiment.

Figure 9:
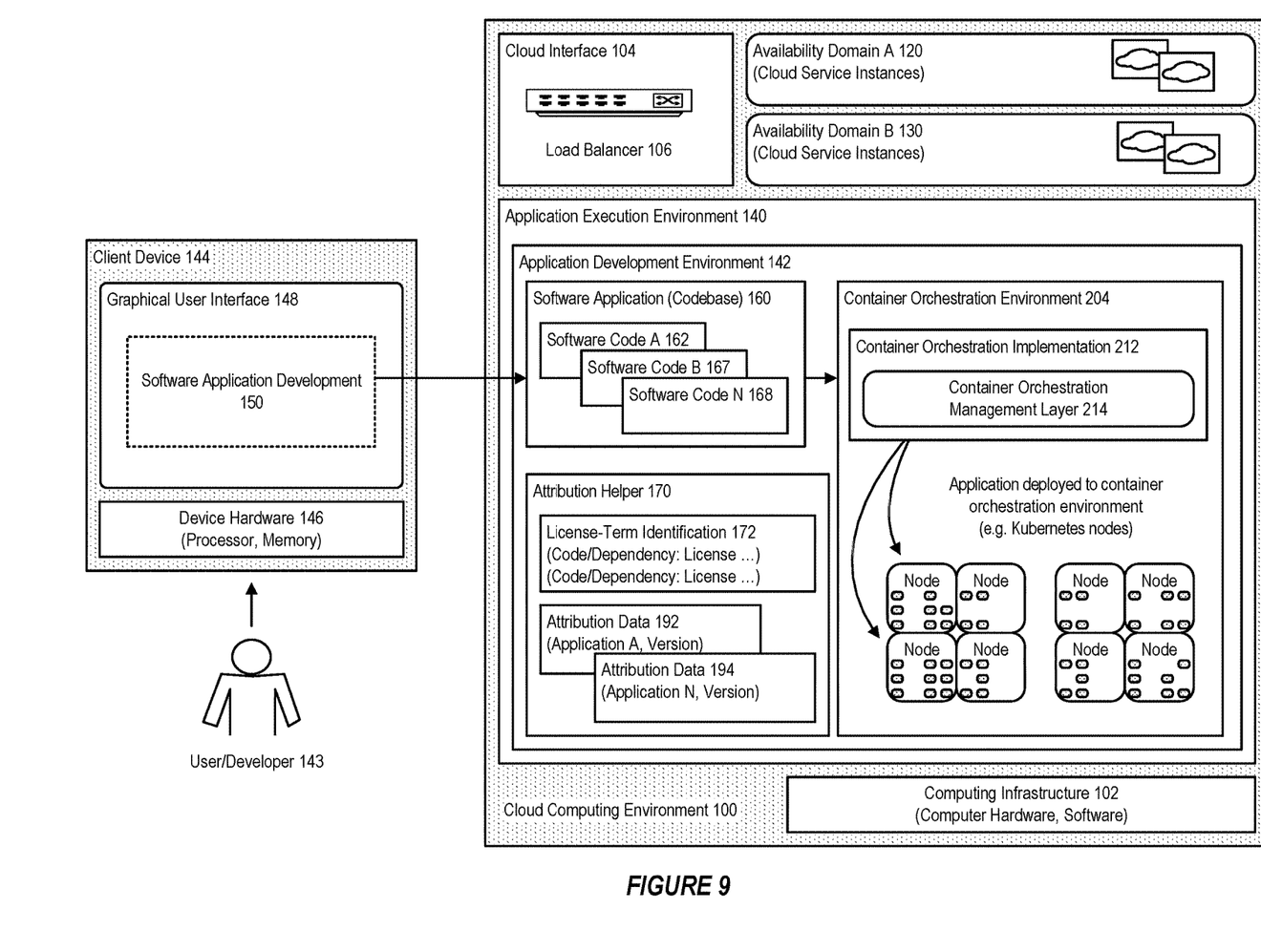
FIG. 9 illustrates an example use of the system for providing a software application within a containerized environment, in accordance with an embodiment.

As illustrated in FIG. 9, in accordance with an embodiment, the container orchestration environment 204 enables an application to be deployed to the environment. The container orchestration implementation 212 provides a container orchestration management layer 214 adapted to schedule application workload containers to run on various nodes. (e.g., Kubernetes) worker nodes.

The example computer system illustrated in FIG. 9 is provided for purposes of illustrating a computing environment that can utilize attribution associated with licensed software code. In accordance with other embodiments, the various components, processes, and features described herein can be used with other types of computer systems or computing environments, including both cloud-based and non-cloud-based environments, to determine an attribution associated with licensed software code in those systems/environments.

Figure 10:
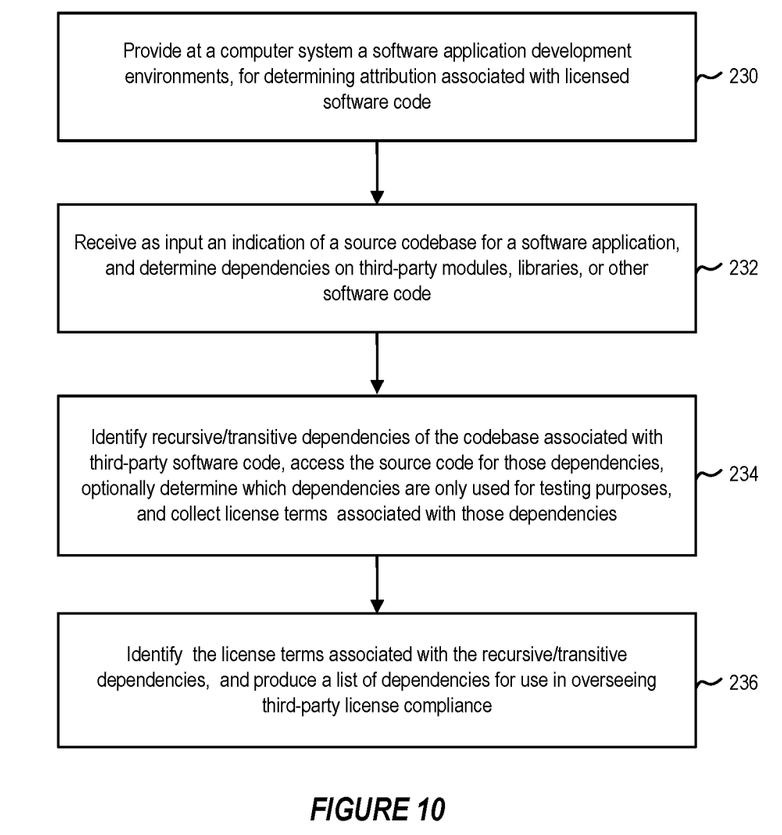
FIG. 10 illustrates a process for determining attribution associated with licensed software

FIG. 10 illustrates a process for determining attribution associated with licensed software.

As illustrated in FIG. 10, in accordance with an embodiment, at step 232, at a computer system, a software application development environment is provided, for determining attribution associated with licensed software code.

At step 234, the system can receive as input an indication of a source application codebase for a software application, and determine dependencies on third-party modules, libraries, or other software code At step 236, the system operates to identify recursive/transitive dependencies of the codebase associated with third-party software code, access the source code for those dependencies, optionally determine which dependencies are only used for testing purposes, and collect license terms associated with those dependencies.

At step 238, the license terms associated with the recursive/transitive dependencies are identified, and a list of dependencies provided for use in overseeing third-party license compliance.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although various examples are described above that illustrate usage with Go, Java, and JavaScript, and with Oracle Cloud or Kubernetes environments, the various components, processes, and features described herein can be used with other types of programming languages and/or computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with software application development environments, for determining attribution associated with licensed software code, comprising:
   a computer system having a software development tool operating as an attribution helper that maintains a license-term identification for a plurality of third-party software code or dependencies known to the system, for use in determining an attribution associated with licensed software code comprising a source application codebase;
   wherein the source application codebase includes dependencies that recursively depend on third-party software code; and
   wherein the system can receive as input an indication of the source application codebase for a software application, determine within the source application codebase the dependencies on the third-party software code, and output associated license attributions for that source application codebase, including recursively scanning the dependencies included within the source application codebase to identify additional software code or dependencies associated therewith;

determining license terms associated with the source application codebase and with the additional software code or dependencies associated therewith; and providing, for the licensed software code comprising the source application codebase, a set of attributions associated with the source application codebase and with the additional software code or dependencies associated therewith.

2. The system of claim 1, wherein the software application development environment inspects a local repository associated with the source application codebase, crawls its dependencies and their licenses, collects license-related documents, and creates a file with this information for subsequent review.

3. The system of claim 2, wherein the system operates to identify licenses or license terms associated with the source application codebase and its dependencies by comparing license terms with known canonical forms.

4. The system of claim 1, wherein the system operates to combine and/or de-duplicate multiple sets of attributions associated with the source application codebase, or generate a set of differences between two versions of attributions, to illustrate changes between the versions.

5. The system of claim 1, wherein if the system detects potential licensing issues associated with the use of third-party modules, libraries, or other software code, then a notification is generated.

6. The system of claim 1, wherein the system operates to identify, within license terms associated with recursive/transitive dependencies, license text or variations, and produce a list of dependencies associated with each license.

7. The system of claim 1, wherein the system recursively scans dependencies, and scans the source code for license notices associated therewith.

8. A method for use with software application development environments, for determining attribution associated with licensed software code, comprising:

providing, at a computer system, a software application development environment that maintains a license-term identification for a plurality of third-party software code or dependencies known to the system, for use in determining an attribution associated with licensed software code comprising a source application codebase, wherein the source application codebase includes dependencies that recursively depend on third-party software code;

receiving as input an indication of the source application codebase for a software application;

determining within the source application codebase the dependencies on the third-party software code; and outputting associated license attributions for that source application codebase, including recursively scanning the dependencies included within the source application codebase to identify additional software code or dependencies associated therewith;

determining license terms associated with the source application codebase and with the additional software code or dependencies associated therewith; and providing, for the licensed software code comprising the source application codebase, a set of attributions associated with the source application codebase and with the additional software code or dependencies associated therewith.

9. The method of claim 8, wherein the software application development environment inspects a local repository associated with the source application codebase, crawls its dependencies and their licenses, collects license-related documents, and creates a file with this information for subsequent review.

10. The method of claim 8, wherein the system operates to identify licenses or license terms associated with the source application codebase and its dependencies by comparing license terms with known canonical forms.

11. The method of claim 8, wherein the system operates to combine and/or de-duplicate multiple sets of attributions associated with the source application codebase, or generate a set of differences between two versions of attributions, to illustrate changes between the versions.

12. The method of claim 8, wherein if the system detects potential licensing issues associated with the use of third-party modules, libraries, or other software code, then a notification is generated.

13. The method of claim 8, wherein the system operates to identify, within license terms associated with recursive/transitive dependencies, license text or variations, and produce a list of dependencies associated with each license.

14. The method of claim 8, wherein the system recursively scans dependencies, and scans the source code for license notices associated therewith.

15. A non-transitory computer readable storage medium having instructions thereon, which when read and executed by a computer including one or more processors cause the computer to perform a method comprising:

providing, at a computer system, a software application development environment that maintains a license-term identification for a plurality of third-party software code or dependencies known to the system, for use in determining an attribution associated with licensed software code comprising a source application codebase, wherein the source application codebase includes dependencies that recursively depend on third-party software code;

receiving as input an indication of the source application codebase for a software application;

determining within the source application codebase the dependencies on the third-party software code; and outputting associated license attributions for that source application codebase, including recursively scanning the dependencies included within the source application codebase to identify additional software code or dependencies associated therewith;

determining license terms associated with the source application codebase and with the additional software code or dependencies associated therewith; and providing, for the licensed software code comprising the source application codebase, a set of attributions associated with the source application codebase and with the additional software code or dependencies associated therewith.

16. The non-transitory computer readable medium of claim 15, wherein the software application development environment inspects a local repository associated with the source application codebase, crawls its dependencies and their licenses, collects license-related documents, and creates a file with this information for subsequent review.

17. The non-transitory computer readable medium of claim 15, wherein the system operates to identify licenses or license terms associated with the source application codebase and its dependencies by comparing license terms with known canonical forms.

18. The non-transitory computer readable medium of claim 15, wherein the system operates to combine and/or de-duplicate multiple sets of attributions associated with the source application codebase, or generate a set of differences between two versions of attributions, to illustrate changes between the versions.

19. The non-transitory computer readable medium of claim 15, wherein if the system detects potential licensing issues associated with the use of third-party software code, then a notification is generated.

20. The non-transitory computer readable medium of claim 15, wherein the system operates to identify, within license terms associated with recursive/transitive dependencies, license text or variations, and produce a list of dependencies associated with each license; and     wherein the system recursively scans dependencies, and scans the source code for license notices associated therewith.

\* \* \* \* \*

UNITED STATES PATENT AND TRADEMARK OFFICE
CERTIFICATE OF CORRECTION

PATENT NO. : 11,971,965 B2  
APPLICATION NO. : 17/553587  
DATED : April 30, 2024  
INVENTOR(S) : Nelson et al.

Page 1 of 1

It is certified that error appears in the above-identified patent and that said Letters Patent is hereby corrected as shown below:

In the Specification

In Column 2, Line 39, delete "software" and insert -- software. --, therefor.

In Column 8, Line 47, delete "Lcense" and insert -- License --, therefor.

In Column 11, Line 61, delete "code" and insert -- code. --, therefor.

In the Claims

In Column 15, Line 12, in Claim 19, after "third-party" insert -- modules, libraries, or other --, therefor.

Signed and Sealed this  
Fourth Day of February, 2025

Coke Morgan Stewart  
*Acting Director of the United States Patent and Trademark Office*